April 17, 1928.　　　　　　　　　　　　　　　　　　1,666,739
C. S. HORNBERGER
McLEOD TYPE PRESSURE GAUGE
Filed May 4, 1927
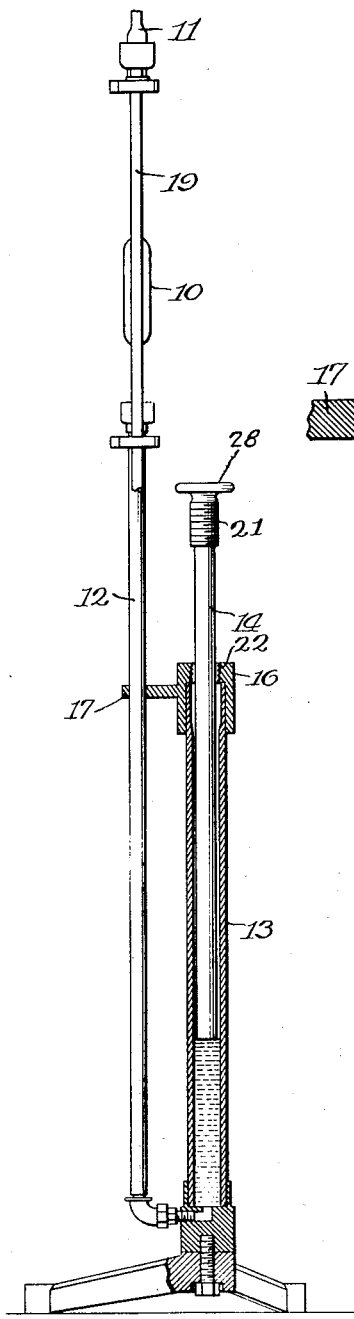
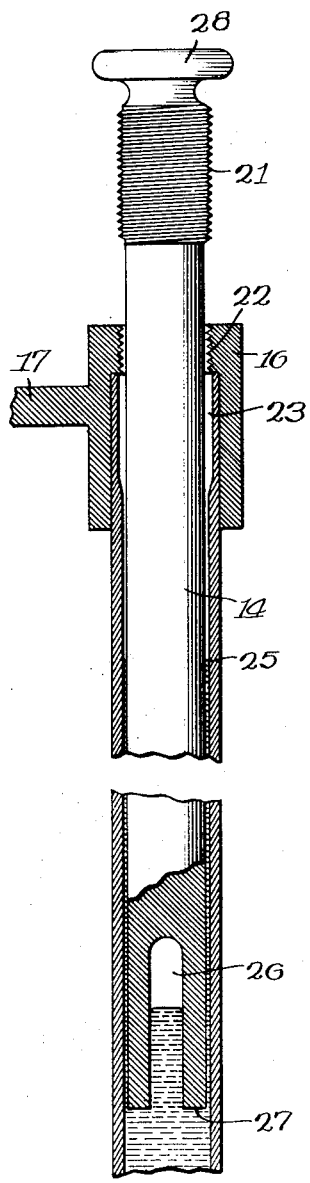
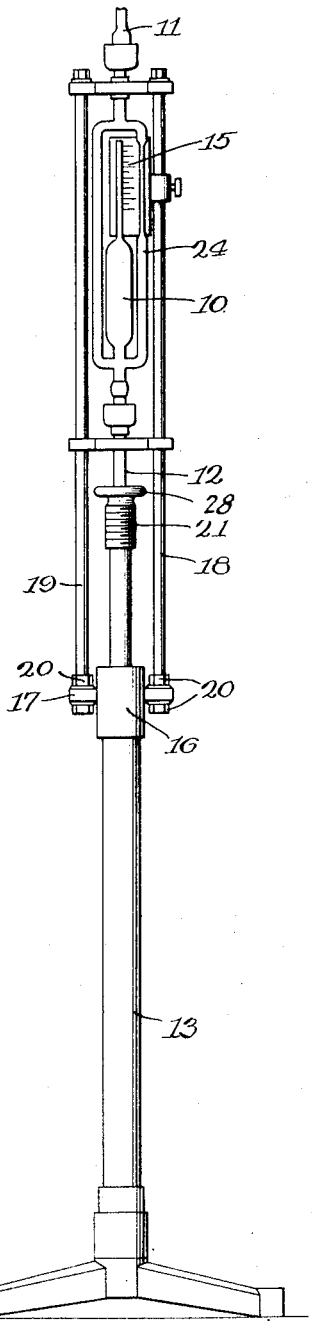
Inventor:
Carl S. Hornberger
By Wilson, Mann & Co. Attys.

Patented Apr. 17, 1928.

1,666,739

UNITED STATES PATENT OFFICE.

CARL S. HORNBERGER, OF CHICAGO, ILLINOIS, ASSIGNOR TO CENTRAL SCIENTIFIC COMPANY, OF CHICAGO, ILLINOIS, A CORPORATION OF ILLINOIS.

McLEOD-TYPE PRESSURE GAUGE.

Application filed May 4, 1927. Serial No. 188,722.

This invention relates to measuring instruments of the type generally known as McLeod gauges and has for its principal object to facilitate the adjustment of the head of mercury and prevent vibration thereof when fine adjustments are being made. Further objects and advantages of the invention will be revealed as the disclosure proceeds and the description is read in connection with the accompanying drawings, illustrating the preferred embodiment of the invention, and in which Fig. 1 is a front elevation of a McLeod gauge for measuring low gas pressures;

Fig. 2 is a side elevation of Fig. 1 with the cistern and pedestal in section, and Fig. 3 is an enlarged vertical section through the cistern with parts broken away.

The structure shown in the drawings includes a glass measuring head 10 connected at its upper end with a low pressure system 11 and its lower end with a barometric column 12 which, in turn, is connected with the mercury system 13, equipped with a plunger 14 by which the mercury may be raised into the measuring head 10 to indicate on the scale 15 the pressure in the system 11.

The upper end of the system 13 is equipped with a collar 16 telescoping with the body and having a flange 17 receiving rods 18 and 19 clamped thereto by nuts 20.

The plunger 14 in this preferred form is a cylindrical rod of wood having at its upper end an enlarged threaded portion 21 adapted to engage threads 22 in the upper end of the collar 17. Above the threads 21 the plunger has a knob 28 by which it may be readily manipulated. The bore of the cistern 13 is slightly enlarged at 23 to provide clearance for the threads 21.

The instrument is ordinarily in the condition indicated in Figs. 1 and 2. When it is desired to take a reading, the operator pushes the plunger 14 down, engages the threads 21 and 22 and rotates the plunger until the mercury in the tube 24 reaches the proper elevation, when the pressure in the system may be read from the scale 15.

In its preferred form the plunger fits the system with clearance so that the mercury rises between the cistern wall and the plunger, as illustrated at 25, Fig. 3, and thus rapidly increases the head as the plunger is forced downwardly.

It has been found that the final adjustment of the plunger necessary to bring the mercury to the exact point in the measuring head is sometimes accompanied with more or less vibration, partly due to a tendency of the threads to chatter and partly due to other causes. In order to overcome this difficulty the lower end of the plunger 14 is equipped with a pocket 26 which may take the form of a cylindrical bore entering from the end wall 27 of the plunger. The contact of the mercury with the end wall 27 traps air in the pocket which forms a cushion that absorbs the vibration and prevents them being communicated through the column to the measuring head.

The invention permits of very rapid rough adjustment of the mercury column followed by an accurate slow motion adjustment that eliminates to a great extent the personal equation in taking readings and effectually eliminates vibrations that cause inaccuracy in the readings.

I claim as my invention:

1. In a device of the class described, the combination of a barometric tube, a cistern connected with the tube and including an elongated barrel for liquid, an elongated plunger mounted to reciprocate in the barrel to alternately displace and be displaced by the liquid, said plunger having a bore so presented to the liquid as to trap air therein and form an air cushion, and a threaded connection between the plunger and cistern to permit adjustment.

2. In a device of the class described, the combination of a barometric tube, an elongated cistern connected with the tube, a plunger having a pocket in one end and movable in the cistern to displace liquid therein, and slow motion means for adjusting the plunger.

In testimony whereof I affix my signature.

CARL S. HORNBERGER.